(12) United States Patent
Zimmer

(10) Patent No.: US 6,625,841 B1
(45) Date of Patent: Sep. 30, 2003

(54) RETAINING SPRING FOR AN ARTICULATED CONNECTION OF A WIPER BLADE TO A WIPER ARM

(75) Inventor: Joachim Zimmer, Sasbach (DE)

(73) Assignee: Robert Bosch GmbH, Stuttgart (DE)

(*) Notice: Subject to any disclaimer, the term of this patent is extended or adjusted under 35 U.S.C. 154(b) by 114 days.

(21) Appl. No.: 09/868,455

(22) PCT Filed: Oct. 14, 2000

(86) PCT No.: PCT/DE00/03624

§ 371 (c)(1),
(2), (4) Date: Sep. 19, 2001

(87) PCT Pub. No.: WO01/30624

PCT Pub. Date: May 3, 2001

(30) Foreign Application Priority Data

Oct. 21, 1999 (DE) .......................................... 199 50 737

(51) Int. Cl.⁷ ................................................. B60S 1/40
(52) U.S. Cl. ................................ 15/250.32; 15/250.44; 15/250.351
(58) Field of Search ........................ 15/250.32, 250.43, 15/250.44, 250.361, 250.33, 250.351

(56) References Cited

U.S. PATENT DOCUMENTS

| 4,324,019 A | 4/1982 | Mohnach | 15/250.32 |
| 4,608,728 A | 9/1986 | Sumins | 15/250.32 |
| 4,949,422 A | 8/1990 | Bauer | 15/250.32 |

FOREIGN PATENT DOCUMENTS

| DE | 4224866 | * 2/1994 | 15/250.32 |
| EP | 0606846 | * 7/1994 | 15/250.32 |
| FR | 1069875 | * 2/1954 | 15/250.32 |

* cited by examiner

Primary Examiner—Gary K. Graham
(74) Attorney, Agent, or Firm—Michael J. Striker

(57) ABSTRACT

The retaining spring (10) is used to produce an articulated connection of a wiper blade (11) to a wiper arm (12) of a vehicle; the retaining spring (10) has a first connecting means (13) for producing a first connection to a retaining element (14) of the wiper blade (11) and a second connecting means (15) for producing a second connection to a carrier element (16) of the wiper arm (12). It is provided that the articulated connection can be produced by means of the first and the second connecting means (13, 15), in the operating position of the retaining spring (10), in a mounting direction (26) that is essentially perpendicular to an operating plane of the wiper blade (11).

19 Claims, 4 Drawing Sheets

RETAINING SPRING FOR AN ARTICULATED CONNECTION OF A WIPER BLADE TO A WIPER ARM

The invention relates to a spring for retaining spring for producing an articulated connection of a wiper blade to a wiper arm of a vehicle, in which the retaining spring has a first connecting means for making a first connection to a retaining element of the wiper blade and a second connecting means for making a second connection to a carrier element of the wiper arm.

The invention also relates to a wiper system comprising a wiper arm and a wiper blade, secured to it in articulated fashion, with the interposition of a retaining spring.

Retaining springs and wiper systems of these generic types are known. In particular, retaining springs are known that are received by an associated end, which is U-shaped in longitudinal section, of the wiper arm in the articulated connection region, thus producing a snap connection. Articulated connections embodied in this way are difficult to mount and relatively hard to manipulate with regard to securing a wiper blade to the corresponding wiper arm. Removing the wiper blade from the wiper arm also entails relatively major effort, possibly requiring the use of special aids in manipulation.

SUMMARY OF THE INVENTION

The retaining spring of the invention is characterized in that the articulated connection can be produced by means of the first and the second connecting means, in the operating position of the retaining spring, in a mounting direction that is essentially perpendicular to an operating plane of the wiper blade. As a result, the articulated connection can be produced in a way that is especially easy to mount and manipulate, since during the entire mounting process the retaining spring can remain in the operating position with respect to the wiper blade and the wiper arm and thus need not assume any additional, special mounting positions. The mounting can advantageously be done in a single direction, which is perpendicular to the operating plane of the wiper blade. This is accordingly a direction which in the operating position of the wiper blade leads essentially at a right angle to and away from a surface of a window of a vehicle. This mounting direction is especially favorable in terms of manipulation, since the person mounting a wiper blade on a wiper arm does not have to provide any special rotary motions of the retaining spring in the articulation region of the wiper blade; instead, rectilinear motions of the retaining spring, or of the wiper blade with the premounted retaining spring, and/or of the wiper arm, maintaining the operating position of the retaining spring, suffice to produce a complete and reliable articulated connection between the wiper blade and the wiper arm with the interposition of the retaining spring.

Advantageously, the first connecting means is embodied as a first seat accessible from outside, and the second connecting means is embodied as a second seat accessible from outside. Because the two connecting means of the retaining spring are each embodied as a seat accessible from outside, it is possible to achieve an easily mounted snap connection of the wiper blade and of the wiper arm with the retaining spring disposed between them; the mounting direction in each case is always essentially perpendicular to the operating plane of the wiper blade. Since the articulated connection region of the wiper blade and of the wiper arm is preferably of metal in each case, and the retaining spring is advantageously of a suitable plastic material, it is advantageous, in particular from a production standpoint, to embody the first and second connecting means each as a seat, to make designs of the wiper blade and the wiper arm possible that are structurally relatively simple; this allows the production of an easily mounted, reliable articulated connection.

Preferably, the second seat is embodied as a receptacle unit for the carrier element, and the retaining spring has a stop means that limits the reception of the carrier element. Embodying the second seat as a receptacle unit makes it possible to design the carrier element relatively simply, for instance as a rib that protrudes from the wiper arm and that can be introduced in an especially easily mounted way into the second seat in the mounting direction. Because a stop means is furnished on the retaining spring, it is possible in an easily mounted and reliable way to achieve a correct reception of the carrier element in the second seat.

Advantageously, the stop means is embodied as a structured surface outside the receptacle unit. Because the stop means is embodied outside the receptacle unit, it is not in direct operative connection with the carrier element but instead can be put into contact with a corresponding counterpart face of the wiper arm. The carrier element, embodied for instance as a rib, merely has a carrier function; the introduction length of the carrier element (rib) to be introduced into the second seat defines a separate stop means. This prevents damage to the second seat from the carrier element in the mounting direction, since the stop means always assures correct positioning of the carrier element in the receptacle unit. A collision between the carrier element and the receptacle unit in the mounting direction is thus avoided. By means of a geometric structuring of the surface of the retaining spring acting as a stop means, it is possible, for instance by means of beadlike protrusions, to embody a relatively large effective surface area as a stop face, with relatively slight frictional contact between the retaining spring and the wiper arm.

Advantageously, the first connection and the second connection are embodied as an elastic and releasable snap connection. An elastic and releasable snap connection is especially easy to mount and can be achieved especially fast.

It is especially advantageous that both the first and the second snap connection can be achieved in a single mounting direction.

In a preferred embodiment, the first seat is essentially U-shaped in longitudinal section, and the retaining element of the wiper blade is embodied as a rivet.

A first seat embodied as U-shaped in longitudinal section is simple to achieve from a production standpoint and at the same time has the requisite stability for a reliable snap connection to the retaining element of the wiper blade. Such a snap connection is advantageously effected with a retaining element embodied as a rivet. Such wiper blades, which have a middle bracket with a rivet (rolling rivet) as a retaining element, can be manufactured relatively inexpensively and are relatively easy to install.

Advantageously, the retaining spring is embodied in one piece. By means of a one-piece retaining spring, the number of parts to be mounted in order to produce the articulated connection is reduced to a minimum, that is, to three construction parts (the wiper blade, retaining spring, and wiper arm). From a production standpoint, a retaining spring that can be made from a suitable plastic material is relatively simple to achieve in the form of a one-piece construction element.

Preferably, the receptacle unit is embodied as two receptacles, which are essentially U-shaped in longitudinal section and between which the first seat is disposed. In this way, it is possible to create a force-symmetrical articulated connection, in which during the mounting, no or virtually no forces that generate torque and/or bending moment are introduced into the retaining spring.

Advantageously, the walls of the first and second seat in longitudinal section together describe essentially the shape of a W, and the access openings of the two receptacles forming the second seat are located in the opposite direction with respect to the opening of the first seat. Such a retaining spring, embodied essentially axially symmetrically, makes a self-securing disposition of the retaining element of the wiper blade and of the carrier element of the wiper arm in the retaining spring possible. This can be ascribed to the fact that an external pressure force, acting in the mounting direction and oriented inward relative to the retaining spring, presses the retaining element and the carrier element into the associated seat and thus exerts a self-securing influence on the articulated connection. Especially in the operating position of the wiper system, such a pressure force is permanently transmitted to the retaining spring from the wiper arm and the wiper blade resting on a vehicle window. Thus no additional separate locking elements are necessary to produce a reliable articulated connection.

Advantageously, the walls of the first seat are elastically pivotable relative to one another. By means of an elastic pivotability of the walls of the first seat, a snap connection of the retaining element in the first seat can be attained that is easy to mount and that ensues automatically when mounting force is suitably brought to bear in the mounting direction.

In a preferred embodiment, the receptacle unit is provided with elastic snap means, by means of which a nonpositive connection to the carrier element of the wiper arm can be produced. The embodiment of such elastic snap means on the receptacle unit makes a reliable, easily mounted connection of the carrier element to the retaining spring possible. The snapping and unsnapping force of the elastic snap means that has to be overcome can advantageously be adapted to a given application by suitable structural provisions.

Advantageously, on each of its free longitudinal ends, the retaining spring has one guide portion, which is essentially U-shaped in cross section and which can be slipped from outside onto a middle bracket of the wiper blade. A guide portion embodied in this way on the respective longitudinal end of the retaining spring assures fast, stable mounting of the retaining spring on the middle bracket of the wiper blade. Thus not only is a snap connection created between the retaining element (rivet) of the wiper blade and the retaining spring, but in addition a touch contact, which may ensue with friction, is established between the corresponding surfaces of the guide portions and of the middle bracket of the wiper blade. Once again, when the guide portion of essentially U-shaped cross section is slipped on, the frictional forces can be operative, by means of suitable structuring of the contact surface, for instance by the embodiment of beads on the inside surfaces of the guide portion, over a relatively wide range, and their magnitude can be adapted to the given application. With regard to the frictional forces occurring upon mounting between the respective guide portion and the middle bracket of the wiper blade, a force-symmetrical design of the retaining spring is advantageously provided.

In a preferred embodiment, the snap means are embodied as a profile that is open toward the outside and is elastically compressible from outside. Designing the snap means as an open profile prevents the establishment of excessive prestressing (tensile and/or compressive stress) in the snap means in the state of repose, or in other words after the articulated connection has been produced. Such prestresses, occurring in the form of compressive and/or tensile stresses, can come about from the influence of weathering (ambient temperature), for instance.

In a further embodiment, the snap means are embodied as a profile that is closed toward the outside and is elastically compressible from outside. The snap means, embodied as a profile that is closed toward the outside, are characterized by a relatively high stability. Furthermore, a snap means designed as a profile closed off toward the outside makes a compact construction of the retaining spring that is free of outer edges possible.

The wiper system of the invention is characterized in that in the region of the articulated connection, the wiper arm is provided with an opening, from which at least one and in particular two spaced-apart ribs protrude inward as a carrier element and are received in the associated receptacle, which is U-shaped in longitudinal section, of the second seat, forming an elastic snap connection by the snap means of the retaining spring. A wiper arm with one opening and two inward-protruding ribs as a carrier element is relatively simple to make from a manufacturing standpoint. Furthermore, the carrier element embodied as two ribs makes it especially easy from a mounting standpoint to produce the articulated connection, since the two spaced-apart ribs merely need to be introduced in the mounting direction into the receptacle, which is U-shaped in longitudinal section, of the second seat, forming an elastic snap connection, by means of the snap means that enter into operative connection with the ribs. Thus no rotary or positioning motions of the retaining spring relative to the wiper arm and/or the wiper blade are necessary for producing an effective, correct articulated connection between the wiper arm and the wiper blade.

Advantageously, the wiper arm, at least in the region of the articulated connection, is embodied essentially as a U-shaped profile in cross section. Embodying the wiper arm in the region of the articulated connection as a profile that is U-shaped in cross section on the one hand forms a shield of the ribs protruding inward into the U-shaped profile and thus lessens the risk of injury to the person making the articulated connection during mounting or unmounting of the wiper blade. On the other hand, given a suitable design of the flanks of the U-shaped profile of the wiper arm in the region of the articulated connection, it is also possible to shield the snap connection of the retaining element (rivet) of the wiper blade in the first seat of the retaining spring laterally in such a way that the connection between the retaining spring and the retaining element of the wiper blade is not apparent from outside. A retaining spring shielded in this way is additionally protected against external influences that can undesirably undo the snap connection between the retaining element of the wiper blade and the retaining spring.

Preferably, the snap means, after the snap connection has been made, are accessible from outside through the opening of the wiper arm. Snap means that are accessible from outside are advantageous since they enable problem-free release of the articulated connection and replacement of an old, worn wiper blade with a new wiper blade. This kind of accessibility of the snap means thus assures easily manipulated unmounting of a wiper blade or of the retaining spring from the wiper arm.

In a preferred embodiment, the ribs are each provided with two spaced-apart chamfers, and one of the two chamfers is embodied on one free end of the corresponding rib, and the second chamfer is provided in the region of the snap means operatively connected to it. The ribs can be provided with chamfers in an especially simple way from a production standpoint. These chamfers enable a fast and reliable connection of a wiper arm to the retaining spring, forming a snap connection. The first chamfer, embodied on one free end of the corresponding rib, assures an elastic deformation of the corresponding snap connection that widens the opening of the second seat, in order to guarantee an unhindered introduction of the associated rib into the receptacle, which is U-shaped in longitudinal section, of the second seat. The second chamfer, after the rib has been introduced completely into the receptacle, comes into operative contact with the associated snap means in such a way that an automatically ensuing snap connection occurs, brought about by the operative elastic restoring force of the snap means. The snap connection between the snap means and the rib is thus effected by an automatic, elastic back-deformation of the corresponding snap means, as a result of which the opening spacing is reduced. During the production of the second connection, the snap means remains continuously in touch contact with the rib, whose two chamfers generate the elastic motion of the corresponding snap means while the rib is being introduced into the second seat.

Advantageously, the ribs are in external touch contact with the associated wall of the first seat which is essentially U-shaped in longitudinal section. To allow the retaining spring to be embodied as compactly as possible, the first and second seat are disposed in the shape of a W relative to one another, so that the walls of the first, U-shaped, centrally disposed seat simultaneously represent a corresponding wall of one of the two laterally disposed seats that are also U-shaped in longitudinal section. Because of the touch contact of the ribs with the outer surface of a corresponding wall of the first seat, where the outer surface of the first seat represents a corresponding inner surface of the second seat, this originally elastically bendable wall of the U-shaped first seat is reliably kept in position once the articulated connection has been made, so that the snap connection between the retaining element (rivet) of the wiper blade and the first seat is stabilized.

Preferably, the flanks of the wiper arm, which is embodied as essentially a U-shaped profile in cross section, cover the connection between the wiper blade and the retaining spring in such a way as to make it invisible from outside. This enables the use of a wiper blade whose retaining element is embodied as a rivet (rolling rivet). A wiper blade with a rivet as a retaining element is simple to make from a production standpoint and is relatively inexpensive. By means of the flanks of the profile, which is U-shaped in cross section, of the wiper arm, the entire articulated connection is shielded laterally, so that in the operating position of the wiper system, it is advantageously not apparent from outside which type of retaining element the associated wiper blade is provided with.

In a preferred embodiment, in the connection region the wiper blade is provided with two spaced-apart openings, between which the retaining element is disposed and through which the walls of the receptacle unit of the retaining spring protrude. The two spaced-apart openings of the wiper blade advantageously make the walls of the receptacle unit of the retaining spring accessible from outside. This makes it possible, by transmission of a corresponding external compressive force on the walls of the receptacle unit of the retaining spring after the articulated connection has been made and by simultaneously restraining the wiper blade, to undo the snap connection between the retaining element (rivet) of the wiper blade in the first seat of the retaining spring. This kind of undoing of the snap connection between the retaining element (rivet) and the first seat of the retaining spring is possible, however, only if beforehand the snap connection between the two retaining ribs and the elastic snap means has been undone, since when the ribs are disposed in the receptacles, the ribs, because of the external touch contact with the associated walls of the first seat that is U-shaped in longitudinal section prevent an elastic motion or bending of the walls of the first seat that releases the retaining element of the wiper blade.

Further advantageous features of the invention will become apparent from the description.

BRIEF DESCRIPTION OF THE DRAWINGS

The invention is described in further detail below in several exemplary embodiments in conjunction with the associated drawings. Shown are.

DESCRIPTION OF THE PREFERRED EMBODIMENTS

Figure 1:
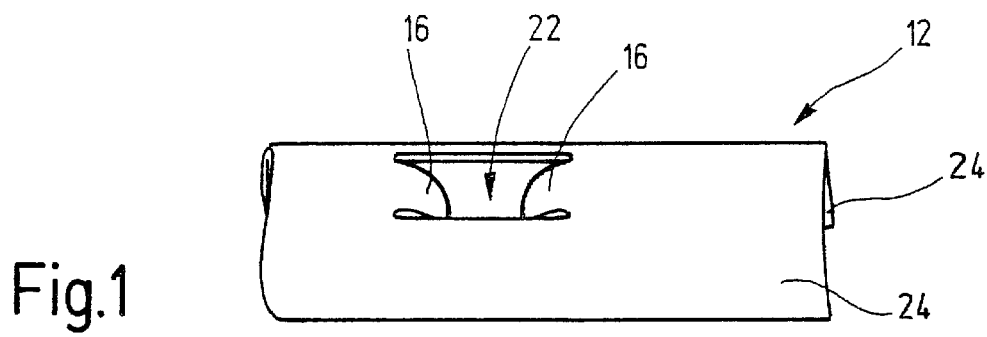
FIG. 1, a schematic, perspective top view of a wiper arm of the invention.
Figure 2:
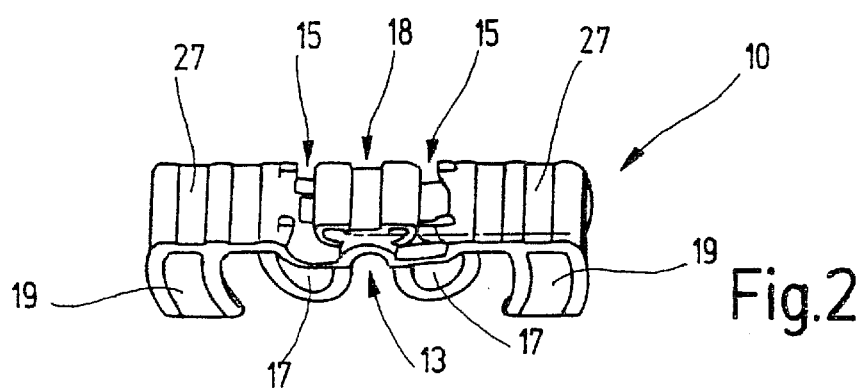
FIG. 2, a schematic, perspective top view of a retaining spring of the invention.
Figure 3:
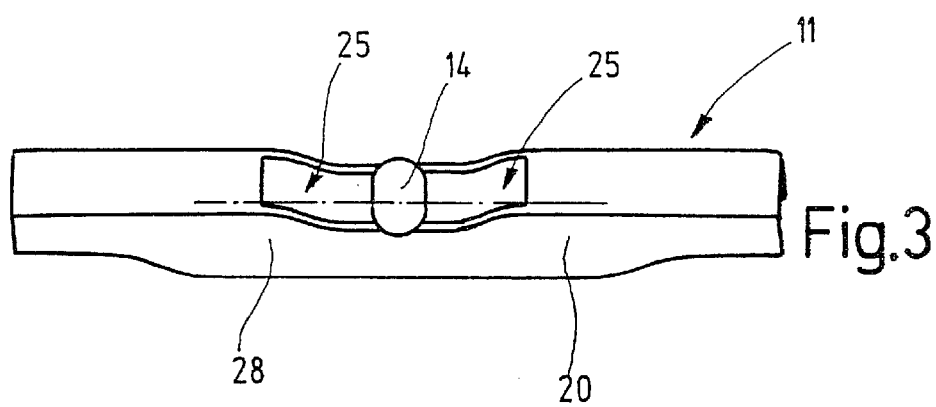
FIG. 3, a schematic, perspective top view of an articulated connection region a wiper arm of the invention.
Figure 4:
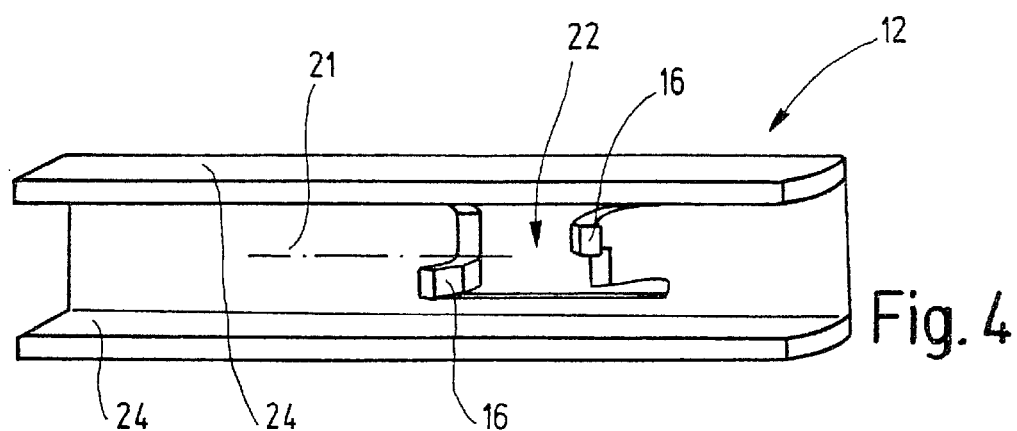
FIG. 4, a schematic, perspective bottom view of the wiper arm of FIG. 1.
Figure 5:
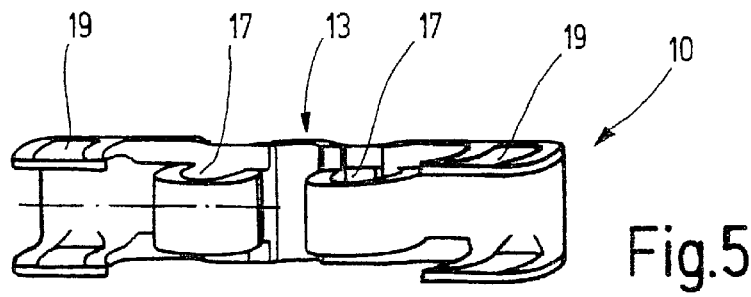
FIG. 5, a schematic, perspective bottom view of the retaining spring of FIG. 2.
Figure 6:
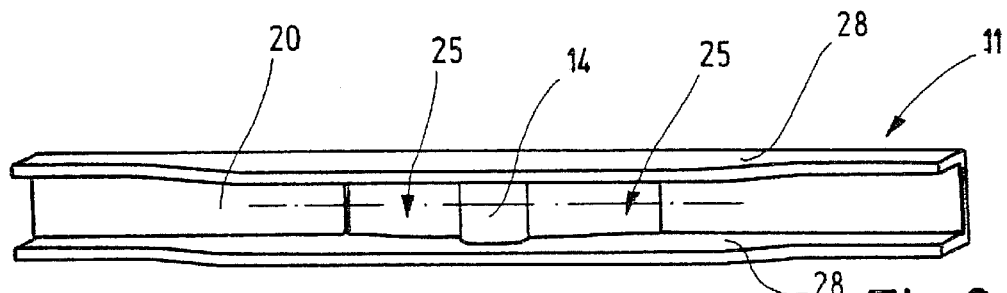
FIG. 6, a schematic, perspective bottom view of the wiper blade of FIG. 3.

With reference to FIGS. 1–6, the corresponding articulation regions of a wiper arm 12 (see FIGS. 1 and 4), of a retaining spring 10 (see FIGS. 2 and 5) and of a wiper blade 11 (see FIGS. 3 and 6) are shown. The retaining spring 10 is used to produce an articulated connection of the wiper blade 11 to the wiper arm 12 of a vehicle (not shown); the retaining spring 10 is to be disposed between the wiper blade 11 and the wiper arm 12. To that end, the retaining spring 10 has a first connecting means 13, which is embodied as a first seat 13 accessible from outside. The first seat 13 is used to produce a first connection to a retaining element 14 of the wiper blade 11. The retaining spring 10 further has a second connecting means 15, which is embodied as a second seat 15 accessible from outside. The second seat 15 is used to produce a second connection to a carrier element 16 of the wiper arm 12. The first connection between the retaining spring 10 and the wiper blade 11 and the second connection between the retaining spring 10 and the wiper arm 12 are each embodied as elastic and releasable snap connections. The first seat 13 is embodied as substantially U-shaped in longitudinal section. The second seat 15 is embodied as a receptacle unit for the carrier element 16 of the wiper arm 12, and the receptacle unit comprises two receptacles 17, which are essentially U-shaped in longitudinal section and between which the first seat 13 is disposed. The walls of the first and second seat 13, 15 in longitudinal section together thus describe essentially the shape of a W, and the access openings of the two receptacles 17 forming the second seat 15 are located in the opposite direction with respect to the opening of the first seat 13. On each of its free longitudinal ends, the retaining spring 10 has one guide portion 19, which is essentially U-shaped in cross section and which can be slipped from outside onto a middle bracket 20 of the wiper blade 12. The receptacle unit of the retaining spring 10 is provided with elastic snap means 18, by means of which a nonpositive connection to the carrier element 16 of the wiper arm 12 can be produced. The wiper arm 12, at least in the region of the articulated connection, is embodied essentially as a U-shaped profile in cross section. In the region of the articulated connection, the wiper arm 12 has an opening 22, from which two spaced-apart ribs protrude, as a carrier element 16, into the interior of the U-shaped profile of the wiper arm 12. The two ribs acting as a carrier element 16 serve to be received in the associated receptacle 17, likewise U-shaped in longitudinal section, of the second seat 15, thus forming an elastic snap connection. The one-piece retaining spring also has a stop means 27, which limits the reception of the carrier element 16 and is preferably embodied as a structured surface outside the receptacle unit. The walls of the first seat 13 of the retaining spring 10 are elastically pivotable relative to one another, so that they can enter into the first connection, in the form of a snap connection, with the retaining element 14 of the wiper blade 11, the retaining element in the present case being embodied as rivet. The wiper blade 11, which in the articulated connection region is likewise embodied as essentially U-shaped in cross section, is provided with two spaced-apart openings 25, between which the retaining element 14 (rivet) is disposed and into which the walls, which are essentially U-shaped in longitudinal section, of the two receptacles 17 of the retaining spring 10 are to be introduced in order to produce the first connection. The spaced-apart openings 25 are embodied as through openings, so that once the first connection between the wiper blade and the retaining spring has been made, the walls of the two receptacles 17 protrude through the openings 25 and are accessible from outside. For producing the articulated connection, the retaining spring 10 is slipped onto the middle bracket 20 of the wiper blade 11, forming the first connection (a snap connection between the retaining element 14 and the first seat 13), and then the wiper arm 12, which in the articulation region is essentially U-shaped in cross section, is slipped onto the structural group comprising the retaining spring 10 and wiper blade 11, in such a way that the flanks 24 of the wiper arm 12, embodied as essentially U-shaped in cross section, completely cover the articulated connection laterally, and the elastic snap means 18 are accessible from outside through the opening 22 of the wiper arm 12.

Figure 7:
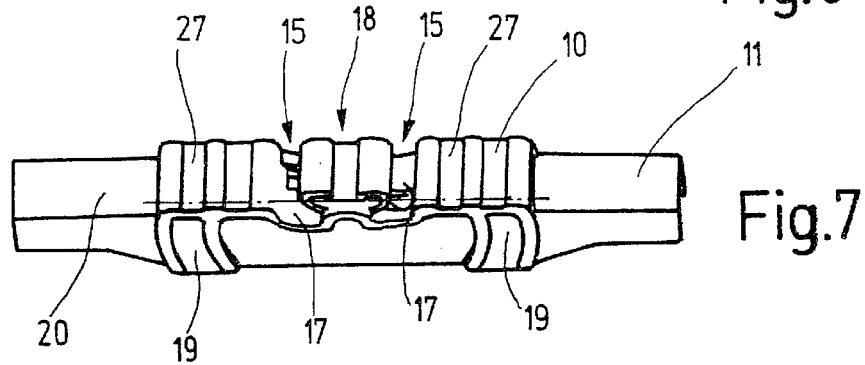
FIG. 7, a schematic, perspective top view of the retaining spring of FIG. 2, mounted on the wiper blade of FIG. 3.

With reference to FIG. 7, the structural group comprising the wiper blade 11 and retaining spring 10 is shown after the first connection has been made, that is, after the retaining element 14 (rivet) has snapped into the first seat 13. In addition to their guide function during the mounting of the retaining spring 10 on the middle bracket 20 of the wiper blade, the guide portions 19 of essentially U-shaped cross section of the retaining spring 10, assure enhanced stability of the one-piece, elastically deformable retaining spring 10. The two guide portions 19 are provided both on the inside (see FIG. 5) and the outside (see FIG. 7) with a respective structured contact surface; the structuring can be attained by the provision of one or more beadlike protrusions on the corresponding contact surfaces. By means of the beadlike protrusions, the effective contact area between the guide portion 19 and the middle bracket 20 of the wiper blade 11 and flank 24 of the wiper arm 12, respectively, is reduced such that a desired friction at the effective contact surface during the production of the articulated connection develops that does not have an interfering effect on the mounting process.

Figure 8:
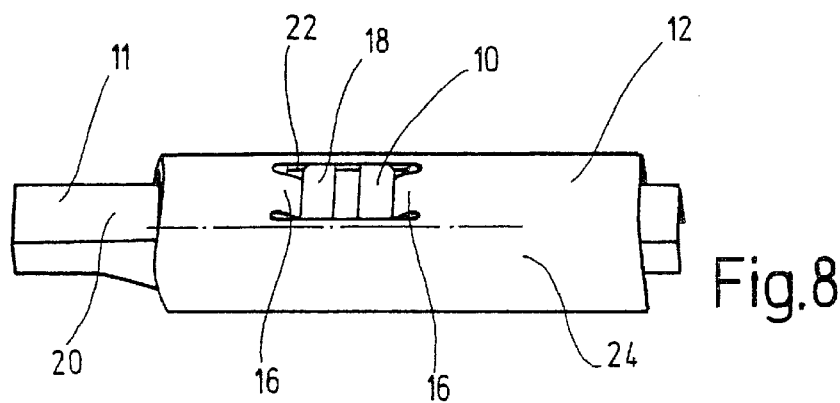
FIG. 8, a schematic, perspective top view of the wiper arm of FIG. 1, mounted on the structural group of FIG. 7.

FIG. 8 shows the articulation region of the wiper arm 12 that is slipped onto the structural group of FIG. 7, forming the articulated connection between the middle bracket 20 of the wiper blade 11 and the wiper arm 12, with the interposed retaining spring 10. The elastic snap means 18 of the retaining spring 10 protrude into the opening 22 of the wiper arm 12 in such a way that they are accessible from outside. At the same time, the ribs of the wiper arm 12, which act as a carrier element 16, protrude into the second seat 15, not visible in FIG. 8, of the retaining spring 10. The flanks 24 of the wiper arm 12, which at least in the articulation region is essentially U-shaped in cross section, shield the articulated connection laterally from the outside, so that the type of articulated connection and in particular the type of first connection between the retaining element 14 (rivet) and the first seat 13 is not apparent from the outside.

Figure 9:
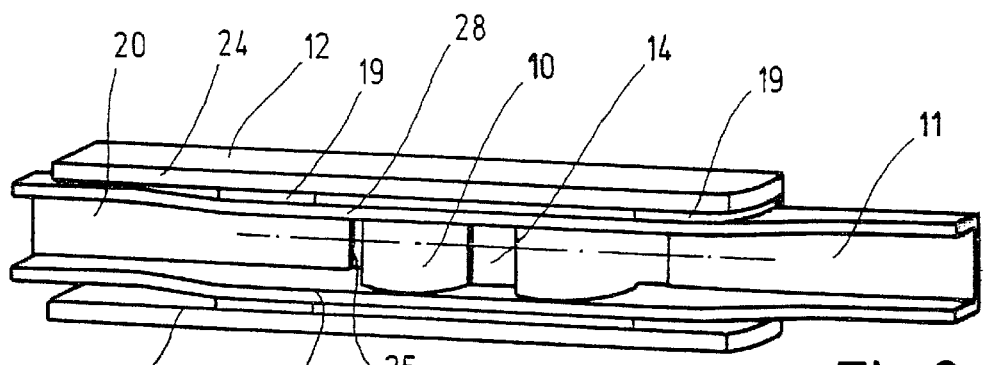
FIG. 9, a schematic, perspective bottom view of the structural group of FIG. 8.

As shown in FIG. 9, the walls of the receptacles 17, which are U-shaped in longitudinal section and which form the second seat 15 of the retaining spring 10, protrude through the openings 25 of the middle bracket 20 of the wiper blade 11, so that after the first connection or the articulated connection is made, they are accessible from outside from the underside of the wiper system, or in other words from the interior of the middle bracket 20, embodied as a U-shaped profile in cross section, of the wiper blade 11. The guide portions 19 of the retaining spring 10, which have a guide function during mounting and which once the articulated connection has been made have a stabilizing effect on the rigidity of the resultant structural group (wiper blade 11, retaining spring 10, wiper arm 12), are disposed in a receiving chamber between the flanks 24 of the wiper arm 12 and the correspondingly opposed flanks 28 of the middle bracket 20 of the wiper blade 11, thus forming a frictional engagement between the respective contact faces.

Figure 10:
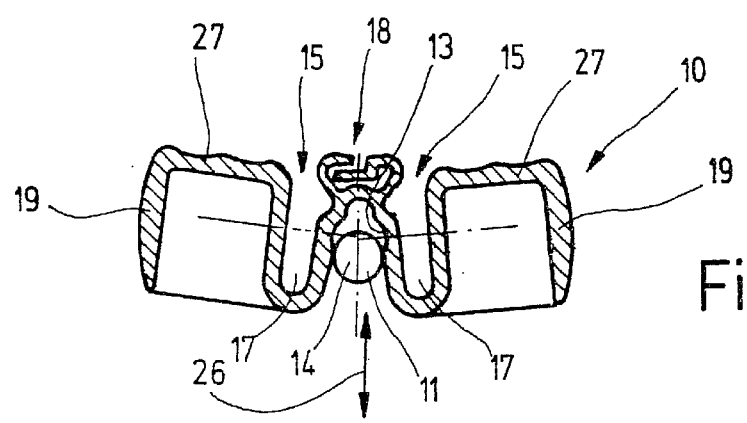
FIG. 10, a schematic side view of a retaining spring in longitudinal section, during mounting onto the wiper blade of FIG. 3.
Figure 11:
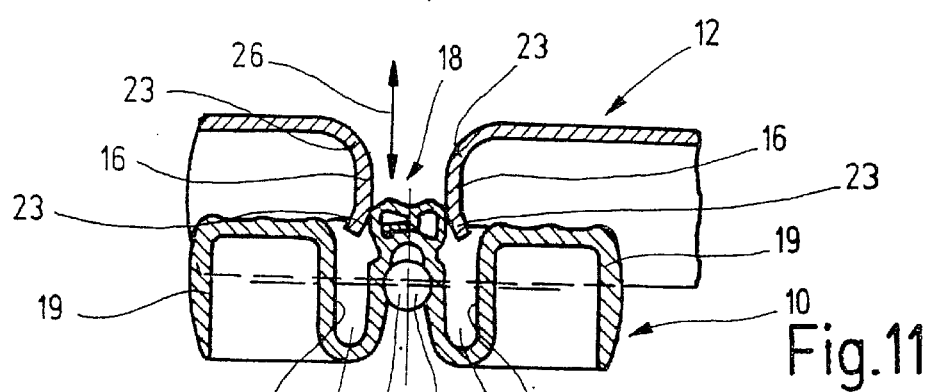
FIG. 11, a schematic side view of a wiper arm in longitudinal section, during mounting onto a structural group of FIG. 7.
Figure 12:
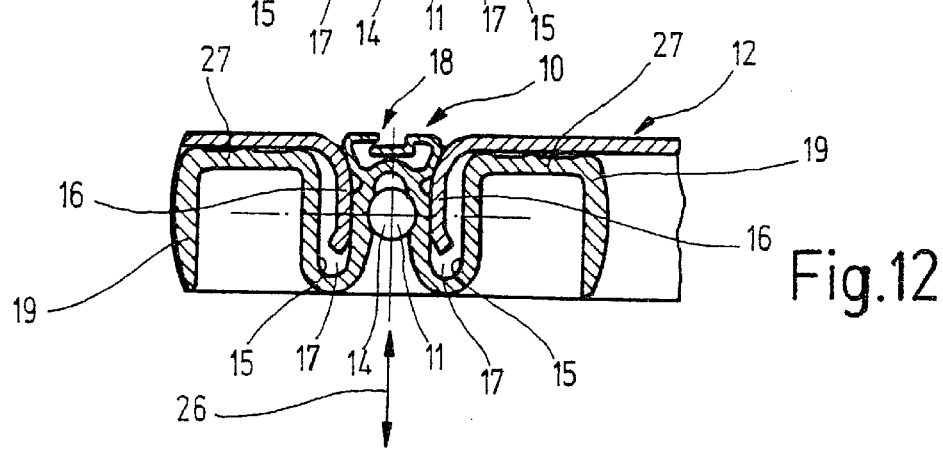
FIG. 12, a schematic side view of a structural group of FIG. 8, in longitudinal section.

FIGS. 10–12 illustrate various successive mounting phases in producing the articulated connection between the wiper blade 11 and the wiper arm 12 with the interposition of the retaining spring 10. In FIG. 10, the one-piece retaining spring, for producing the first connection or in other words for creating a snap connection between the retaining element 14 of the wiper blade 11 and the first seat 13 of the retaining spring 10, is moved in the mounting direction 26 (arrow pointing downward), simultaneously elastically widening the first seat 13 of the elastically deformable retaining spring 10. The mobility of the snap means 18 relative to one another is favorable to an elastic pivoting apart of the walls of the first seat 13 that is necessary in order to make the first connection. Once the first connection has been made, the two ribs acting as a carrier element 16 are introduced into the two receptacles 17 of FIG. 11 that form the second seat 15, while the wiper arm 12, embodied as essentially U-shaped in cross section in the articulation region, is being slipped onto the structural group made beforehand (see FIG. 7). As the ribs are introduced into the receptacles 17, the snap means 18 are first moved elastically toward one another by means of a suitably embodied chamfer 23, simultaneously increasing the respective opening width of the receptacles 17. The chamfers that achieve this effect are embodied on the free end of the ribs of the wiper arm 12. Each of the two ribs also has a further chamfer 23, which is curved in the opposite direction from the chamfer 23 provided on the free end and which thus, upon motion of the corresponding rib in the mounting direction 26 (arrow line pointing toward the receptacles 17) allows the elastic snap means 18 to spring back to a defined snap-locking position. The automatic springing back of the elastic snap means 18 is effected as a result of the restoring forces in the retaining spring 10 that ensue upon an elastic deformation. During the introduction of the ribs into the receptacles 17, the elastic snap means 18 are continuously in frictional contact with the corresponding contact faces of the ribs, so that once the ribs have been introduced to the maximum extent into the receptacles 17, a frictionally engaged snap connection is obtained. The elastic snap means 18 can be completely relaxed in their snapped-in position, or can be slightly prestressed.

As shown in FIG. 12, the surface-structured stop means 27 come into touch contact with the opposed inside face of the top side of the wiper arm 12, which in the articulated region is essentially U-shaped in cross section. This stop prevents the ribs from being able to come into contact, by their free ends that each have a chamfer 23, with the walls of the receptacles 17 in such a way that damage can occur, for instance in the form of a plastic deformation. When the ribs have been introduced completely into the receptacles 17 as in FIG. 12, the ribs are in external touch contact with the corresponding wall of the first seat 13 that is essentially U-shaped in longitudinal section. This disposition of the ribs assures that the first connection, that is, the snap connection, between the retaining element 14 (rivet) and the first seat 13, once the articulated connection has been made, is stabilized, so that the walls of the first seat 13 cannot, unless other actions are taken, be bent outward, undoing the first connection. The ribs acting as a carrier element thus assure not only a simple, easy to mount and reliable connection between the retaining spring 10 and the wiper arm 12 but also and furthermore represent a means of securing against undesired undoing of the connection between the retaining element 14 and the retaining spring 10.

The mounting direction shown in FIGS. 10–12 is represented as a double-headed arrow. The arrow 26 pointing downward means that the retaining spring 10 in FIG. 10 is slipped onto the stationary wiper blade 11 and the wiper arm 12 as in FIGS. 11 and 12 onto the stationary structural group (see FIG. 10). Since to make the articulated connection, that is, the first and second connections, the only critical aspect is a suitable relative motion between the corresponding components in the mounting direction 26, it is in principle also possible for the retaining spring 10 to be stationary and for the wiper blade 11 to be moved upward in the direction of the arrow 26 (see FIG. 10), and then correspondingly with a stationary wiper arm 12 the resultant structural group of FIG. 10 is moved upward in the direction of the arrow 26 (see FIGS. 11 and 12). Thus if the operating position of the same retaining spring 10 is unchanged, the articulated connection is produced by the first and second connecting means 13, 15, that is, by the first seat 13 and the second seat 15 of the retaining spring 10, in a mounting direction 26 that is essentially vertical to an operating plane (not shown) of the wiper blade 11. The mounting direction 26 can point in two opposed directions, as shown in FIGS. 10–12. Finally, a combined mounting in opposed directions but always in the mounting direction 26 can also be accomplished. The operating plane of the wiper blade 11, in the operating position, is the outer surface of a vehicle window over which the wiper blade 11 is moved as needed. In general, the operating plane of the wiper blade 11 is defined as a plane that is perpendicular to the wiping element, which is in touch contact with the vehicle window, of the wiper blade 11.

The elastic snap means 18 of FIGS. 7, 8, 10, 11 and 12 comprise two partly overlapping elements, curved toward one another and pivotable elastically toward and away from one another, which are separate from one another and in the snapped-in position of FIG. 12 lead to an outwardly closed appearance.

Figure 13:
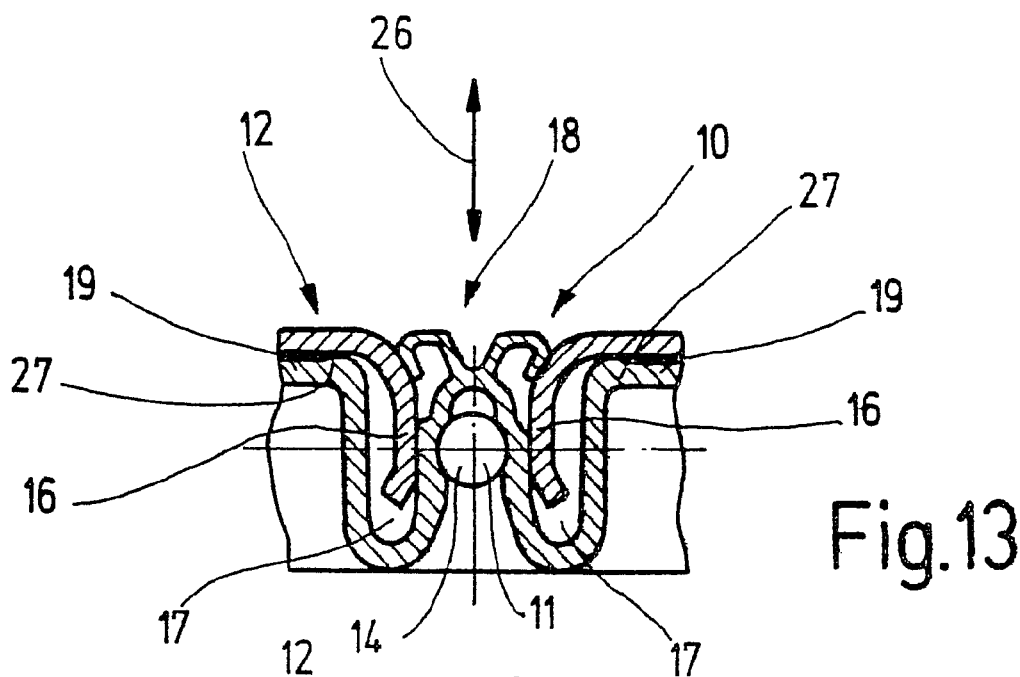
FIG. 13, a structural group of FIG. 8 in longitudinal section, with a retaining spring in a second embodiment.
Figure 14:
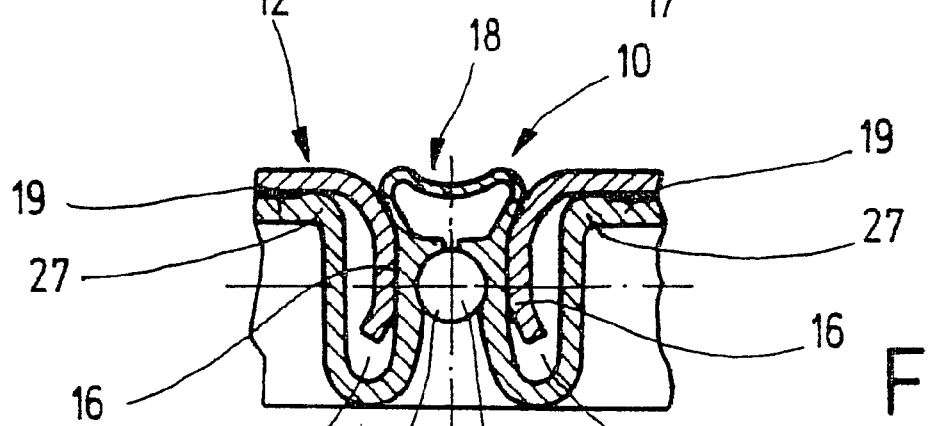
FIG. 14, a schematic front view of a structural group of FIG. 8, in longitudinal section, with a retaining spring in a third embodiment.

FIGS. 13 and 14 show two further embodiments of the elastic snap means 18. The snap means 18 of FIG. 13 again comprise two separate elements, but they are curved away from one another in virtually a half circle and are in operative contact, by a free end portion, with the corresponding rib of the wiper arm 12. The third embodiment of the elastic snap means 18 in FIG. 14 is characterized by a profile closed toward the outside, which in the region of the first seat 13 has an internal gap. The outward-pointing surface of the elastic snap means 18 in FIG. 14 is characterized by edge-free curvatures of a single element that forms both snap means. In the second and third embodiment of the elastic snap means 18, the retaining spring 10 is embodied axially symmetrically with respect to the vertical axis of symmetry. In the first embodiment of the elastic snap means 18 in FIGS. 2, 7, 8, 10, 11 and 12, the retaining spring 10 is embodied virtually completely axially symmetrically with respect to its vertical axis of symmetry, and the two elastically movable elements are not joined to one another. All three embodiments of the elastic snap means 18 can be compressed elastically from outside once the articulated connection has been produced. This makes it easy from the standpoint of manipulation to remove the wiper blade 11 from the wiper arm 12 by undoing the snap connection between the carrier element 16 (ribs) and the second seat 15 (U-shaped receptacles 17) and ensuing undoing of the snap connection between the retaining element 14 (rivet) and the first seat 13.

By means of a retaining spring 10 embodied in this way, incorrect mounting of a wiper blade 11 on a wiper arm 12 can advantageously be practically precluded with the interposition of the retaining spring 10, since to produce a corresponding articulated connection, only three components have to be slipped onto one another in the operating position by a linear motion in the mounting direction 26. It is furthermore possible to premount the retaining spring 10 on the associated wiper blade 11 already, so that upon final mounting of the wiper blade 11 on the wiper arm 12, only two elements, separate from one another (the wiper blade 11 with the premounted retaining spring 10 on the one hand and the wiper arm 12 on the other) have to be joined to one another.

The elastically bendable retaining spring 10 is designed such that after the articulated connection has been produced, it assures good guidance between the wiper blade 11 and the wiper arm 12. The disposition of the first seat 13 and second seat 15 of the retaining spring 10 is selected such that longitudinal forces that occur are transmitted directly from the wiper blade 11 (retaining element 14) to the wiper arm 12 (carrier element 16), by means of an interposed wall of the retaining spring 10. Thus during operation of the wiper system, virtually no tensile stresses, if any, occur in the retaining spring 10. The retaining spring 10 can therefore advantageously be made from a wearproof but relatively brittle material. Transverse forces and moments resulting from them are not transmitted to the ribs acting as a carrier element 16 but rather to the flanks 24 of the wiper arm 12 of U-shaped cross section. As seen particularly in FIG. 7, the U-shaped receptacles 17 of the retaining spring 10 are guided by the inside faces of the flanks 28 of the wiper blade 11, while the guide portions 19 of the retaining spring 10 rest on the outer faces of the flanks 28 of the wiper blade 11. A retaining spring 10 premounted on the wiper blade 11 in this way is distinguished by relatively high rigidity in the operating state. The beads provided on the outer faces of the guide portions 19 of the retaining spring 10, once the articulated connection has been produced, enable a smooth rotary motion of the wiper blade 11 relative to the wiper arm 12, because of the relatively slight friction between the effective contact faces of the guide portions 19 of the retaining spring 10 and the flanks 24 of the wiper arm 12, so that upon actuation of the wiper system, the wiper blade 11 can follow the contour of a three-dimensionally curved window of a vehicle.

What is claimed is:

1. A retaining spring for producing an articulated connection of a wiper blade to a wiper arm of a vehicle, in which the retaining spring has a first connecting means formed as a first seat for making a first connection to a retaining element of the wiper blade arid a second connecting means formed as a second seat for making a second connection to a carrier element of the wiper arm, wherein the articulated connection can be produced by means of the first and the second connecting means (13, 15), in an operating position of the retaining spring (10), by a relative displacement, between the wiper blade and the spring and between the wiper arm and the spring in a mounting direction (26) that is essentially perpendicular to an operating plane of the wiper blade (11), wherein the second seat (15) is embodied as a receptacle unit for the carrier element (16), and wherein the receptacle unit is embodied as two receptacles (17), which are essentially U-shaped in longitudinal section and between which the first seat (13) is disposed.

2. The retaining spring of claim 1, wherein the retaining spring (10) has a stop means (27) that limits the reception of the carrier element (16).

3. The retaining spring of claim 2, wherein the stop means (27) is embodied as a structured surface outside the receptacle unit.

4. The retaining spring of claim 3, wherein the receptacle unit is provided with elastic snap means (18), by means of which a connection to the carrier element (16) of the wiper arm (12) can be produced.

5. The retaining spring of claim 4, characterized in that the snap means (18) are embodied as a profile that is open toward the outside and is elastically compressible from outside.

6. The retaining spring of claim 4, characterized in that the snap means (18) are embodied as a profile that is closed toward the outside and is elastically compressible from outside.

7. The retaining spring of claim 1, wherein the first connection means and the second connection means are embodied as an elastic and releasable snap connection.

8. The retaining spring of claim 1, wherein the first seat (13) is essentially U-shaped in longitudinal section, and the retaining element (14) of the wiper blade (11) is embodied as a rivet.

9. The retaining spring of claim 1, wherein the retaining spring (10) is embodied in one piece.

10. The retaining spring of claim 1, wherein-the-walls of the first and second seat (13, 15) in longitudinal section together describe essentially the shape of a W, and access openings of the two receptacles (17) forming the second seat (15) are located in the opposite direction with respect to an opening of the first seat (13).

11. The retaining spring of claim 1, wherein walls of the first seat (13) are elastically pivotable relative to one another.

12. The retaining spring of claim 1, characterized in that on each of its free longitudinal ends, the retaining spring (10) has one guide portion (19), which is essentially U-shaped in cross section and which can be slipped from outside onto a middle bracket (20) of the wiper blade (12).

13. The wiper system of claim 1, wherein the wiper blade (11), in the connection region, is provided with two spaced-apart openings (25), between which the retaining element (14) is disposed and through which the walls of the receptacle unit of the retaining spring (10) protrude.

14. A wiper system, comprising a wiper arm and a wiper blade secured to it in articulated fashion with the interposition of a retaining spring provided with first and second connecting means formed as first and second seats for making a connection to a retaining element of the wiper blade and to a carrier element of the wiper arm correspondingly, wherein in the region of the articulated connection, the wiper arm (12) is provided with an opening (22), from which at least one and in particular two spaced-apart ribs protrude inward as a carrier element (16) and are received in an associated receptacle (17), which is U-shaped in longitudinal section, of the second seat (15), forming an elastic snap connection by snap means (18) of the retaining spring (10).

15. The wiper system of claim 14, wherein the wiper arm (12), at least in a region of the articulated connection, is embodied essentially as a U-shaped profile in cross section.

16. The wiper system of claim 14, wherein the snap means (18), after the snap connection has been made, are accessible from outside through the opening (22) of the wiper arm (12).

17. The wiper system of claims 14, wherein the ribs are each provided with two spaced-apart chamfers (23), and one of the two chamfers (23) is em bodied on one free end of the corresponding rib, and the second chamfer (23) is provided in the region of the snap means (18) operatively connected to it.

18. The wiper system of claims 14, wherein the ribs are in external touch contact with the associated wall of the first seat (13) which is essentially U-shaped in longitudinal section.

19. The wiper system of claims 14, wherein-the-flanks (24) of the wiper arm (12), which is embodied as essentially a U-shaped profile in cross section, cover the connection between the wiper blade (11) and the retaining spring (10).

* * * * *